[11] 3,881,940
[45] May 6, 1975

[54] COMPOSITION FOR TREATING WOOD
[75] Inventors: Joseph Amundsen; William H. Wetzel, both of Federal Way; Norman Naimy, Seattle; Robert J. Goodwin, Puyallup, all of Wash.
[73] Assignee: Reichhold Chemicals, Inc., White Plains, N.Y.
[22] Filed: July 12, 1973
[21] Appl. No.: 378,583

Related U.S. Application Data
[62] Division of Ser. No. 244,877, April 17, 1972, abandoned.

[52] U.S. Cl. ............. 106/15 AF; 106/285; 117/147
[51] Int. Cl. .............................................. C09d 5/14
[58] Field of Search ..... 106/285, 15 AF; 260/429.5; 117/147

[56] References Cited
UNITED STATES PATENTS

| | | | |
|---|---|---|---|
| 2,160,273 | 5/1939 | Loane | 260/429.5 |
| 2,800,412 | 7/1957 | Shiraishi | 106/15 AF |
| 2,955,945 | 10/1960 | Emond | 106/15 AF |
| 3,062,710 | 11/1962 | Moyle | 106/15 AF |

*Primary Examiner*—Theodore Morris

[57] ABSTRACT

This invention is directed to a method for producing and preserving very light colored wooden objects such as utility poles, fence posts and piling timbers. These wooden objects are treated under heat and pressure with a composition comprising a blend of (I) a blend of (A) from about 1% to about 50% by weight of pentachlorophenol and (B) from about 99% to about 50% by weight of a petroleum oil and (II) from about 0.005% to about 100% by weight based upon the total weight of (I) of a compound containing a heavy metal oxide. Wood treating compositions of this invention are stable against discoloration and formation of sludge during storage and during the wood treating process.

3 Claims, No Drawings

COMPOSITION FOR TREATING WOOD

This is a division of Ser. No. 244,877, filed Apr. 17, 1972 now abandoned.

This invention discloses new wood treating methods and new inhibitor systems for hydrocarbon oil compositions used in wood treating and preserving; these inhibitors stabilize the treating mixture against discoloration and formation of sludge during storage and during the wood treating process. Wood treated with the compositions of this invention are very light in appearance and the efficiency of the treating operations is improved. In general the wood treating compositions comprise (I) a pentachlorophenol-hydrocarbon oil wood treating solution incorporating those co-solvents, waxes, decolorants, inhibitors, surfactants and resins commonly used in the art and (II) from about 0.005% to about 100% by weight of a compound containing a member of the class of compounds classified in Groups IB, IIB, IIA, IVA, IVB, VIA, VIB, and VIII of the Periodic Table.*

*According to the style published by Fisher Scientific Corp. New York, New York under Catalog No. 5-702 (1962).

Pentachlorophenol and oil solutions containing pentachlorophenol are widely used in industry to preserve wood and to prevent or forestall rot and decay. The pentachlorophenol may be directly added to the petroleum hydrocarbon oil and dissolved or it may be prepared as a liquid concentrate in a co-solvent to be later diluted with oil. Wood treating solutions useful for treating poles, fence posts, pilings and other unfinished wood contain from about 1% to 50% pentachlorophenol and generally about 5% pentachlorophenol; these percentages being established from practice in the industry.

Many times it is desirable to incorporate minor proportions of other compounds into the treating solution to impart certain properties to the wooden material being treated. These compounds may include co-solvents such as mineral spirits, waxes such as paraffin wax, resins such as rosen esters and modified rosen esters, surfactants like polyethoxylated diamines and antioxidants such as di-tert butyl para-cresol and amines and the like.

Solutions containing pentachlorophenol and petroleum hydrocarbons soon darken and form a sludge after being prepared thus requiring filtering or decanting prior to being used to treat wood. Furthermore, these solutions darken the surface of the wood during the heating and boiling periods of treating and leave extremely dark greasy surface deposits upon the treated object. In addition the treating mixture continues to darken in use and a carbon type sludge develops and builds up in the wood treating apparatus. This necessitates frequent interruptions of operation to clean out the apparatus and dispose of this foul smelling sludge.

When such treatment is applied to power line or utility poles, the product is not pleasing to the eye and detracts from the natural beauty of the surrounding area.

It is therefore an object of this invention to provide a method for treating and preserving wooden objects which exhibits none of the foregoing characteristics.

Another object of this invention is to provide a method for producing and preserving light colored wooden objects through the use of a new wood treating composition.

Yet another object of this invention is to provide a method for treating and preserving wooden objects during which the treating solution does not discolor and sludge formation is reduced.

Further objects and the entire scope of applicability of the present invention will become apparent from the detailed specification and examples given hereinafter; it should be understood, however, that the detailed specification and specific examples while indicating preferred embodiments of the invention are given by way of illustration only, since various changes and modifications within the spirit and scope of the invention will become apparent to those skilled in the art.

It has now been found that these and other objects can now be achieved by simply treating wooden objects with a wood treating and preserving composition comprising a blend of (I) a blend of (A) from about 1% to about 50% by weight of pentachlorophenol and (B) from about 99% to about 50% by weight of a petroleum hydrocarbon and (II) from about 0.005% to about 100% by weight, based upon the total weight of (I) of a compound containing a member of the class of elements classified in Groups IB, IIA, IIB, IVA, IVB, VIA, VIB, VIII of the Periodic Table.

The wooden objects subject to treatment by this method are very light in color and the treatment composition itself is extremely stable against discoloration and sludge formation.

Results obtained through this invention are surprising and quite dramatic. Example IV and the color photographs therein show the improved performance of the wood treating compositions disclosed herein. Additionally, Examples I and II demonstrate the efficiency of these wood treating compositions in drastically reducing or eliminating sludge and discoloration of the treating solution during treatment.

The new method for treating and preserving wood disclosed by this invention centers upon the use of compounds containing a member of the class of elements classified in Groups IB, IIA, IIB, IVA, IVB, VIA, VIB and VIII of the Periodic Table in conjunction with pentachlorophenol and a petroleum hydrocarbon; with or without additives such as co-solvents, waxes, resins, decolorants, surfactants, inhibitors and stabilizers; such additives being well known in the art.

Advantages gained through the use of this method for treating wood are several fold. The wooden objects themselves are very light in appearance which is quite surprising, since heretofore any wooden objects treated with oil solutions containing pentachlorophenol have been extremely dark and in the majority of cases are greasy black due to sludge formed by the treating solution itself and carried into the wood. It has, up to now, been taken for granted this was normal for this type of treatment and could not be overcome. However, by reference to the photographs in Example IV, it is quite evident that this is not now the case and indeed it is difficult to distinguish between treated and untreated objects. Wooden objects treated by this invention are dry to the touch, not greasy and are light in appearance.

Sludge formation and discoloration of the treating composition during the treating process are also problems associated with pentachlorophenol petroleum hydrocarbon wood treating compositions. As with the problem of wood discoloration, this has become an accepted fact in the art and it has been thought that such problems could not easily be overcome, especially when heavy petroleum solvents were used. It is now possible, through use of the method of this invention to prevent or practically eliminate sludge formation and discoloration of the treating solution both during storage and during the actual treating process. The experiments comprising Example I are designed to rapidly promote the formation of sludge and discoloration. However, comparison of the facts presented therein indicates the superior performance of this method. These results are also obtainable on a commercial scale as demonstrated in Example IV.

Practiced in a general way this method involves treating wooden objects by conventional means under heat and pressure with a treating and preserving composition comprising (I) a blend comprising (A) from about 1% to about 50% by weight pentachlorophenol and (B) from about 99% to about 50% by weight a petroleum hydrocarbon and (II) from about 0.005% to about 100% by weight based upon the weight of (I) of a heavy metal such as titanium or a heavy metal containing compound such as titanium dioxide.

The component (I) may also contain additional co-solvents, waxes, resins, decolorants, surfactants, inhibitors, stabilizers and the like as is desired and used in the art.

Wood treating compositions containing pentachlorophenol dissolved in petroleum hydrocarbon are well known in the art. They may contain from about 1% to about 50% by weight pentachlorophenol and from about 99% to about 50% of a petroleum hydrocarbon. For the practice of this invention it is preferred that the solution be a blend of (A) from about 1% to 10% by weight pentachlorophenol and (B) from about 99% to about 90% petroleum hydrocarbon. The petroleum hydrocarbon may be varied and includes diesel oil, kerosene, Nos. 1, 2 and 3 fuel oils, low, medium and high aromatic oils and the like and mixtures thereof.

To this blend may be added various co-solvents such as mineral spirits, aromatic hydrocarbons, glycols, and the like, waxes such as paraffin wax, resins such as rosen esters and modified rosen esters, surfactants like polyethoxylated diamines and corrosion inhibitors and stabilizers such as di-tert-butyl-cresol, bis (2-hydroxyethyl) cocoamine and the like and decolorants such as diethyl oxalate. It has also been found that silicon dioxide is a useful additive to promote stabilization against discoloration and sludge formation. These additives may be used in amounts ranging from about 0.01% to about 1% by weight based upon the total weight of (A) and (B). The value of 1% by weight is merely a practical upper limit. However, greater amounts of these additives may be used if preferred.

Component II of the wood treating composition is a compound containing a metallic member of the class of elements classified in Groups IB, IIA, IIB, IVA, IVB, VIA, VIB, and VIII of the Periodic Table. This would include the elements copper, silver, gold, zinc, cadmium, germanium, tin, lead, titanium, zirconium, hafnium, iron, cobalt, nickel, ruthenium, rhodium, palladium, osmium, iridium and platinum. These elements may be employed in their free metallic state ie. the metal itself or as an inorganic metallic compound. The preferred metals are titanium, lead, tungsten, iron, chromium, tin, silver, and cobalt and inorganic compounds containing these such as titanium mono-oxide, titanium dioxide, titanium silicate, titanium diboxide, lead oxide, stannic oxide, silver oxide, chromium oxide, cobaltic oxide, tungsten trioxide, iron oxide and the like and mixtures thereof. The amount of the heavy metal compound used may range from about 0.005% to about 100% by weight based upon the total weight of (A) and (B) used. It should be noted that more than 100% by weight might be employed but would serve no practical purpose. The preferred amount of the heavy metal compound used ranges from about 0.005% to about 1% by weight and most preferably between about 0.01% and about 0.18 % by weight based upon the total weight of (A) and (B) employed.

Wooden structures to be treated via the method of this invention are without limit and may be defined as any wooden form which requires protection against attack by weathering, fungus, insects and pests including mill work, utility poles, fence posts, piling timbers and the like.

A typical method for producing and preserving very light colored poles comprises placing wooden poles ranging from dry to green in various sizes ranging from 6 inches in diameter and 12 feet in length to 20 inches in diameter and 100 feet in length in a retort 7 feet in diameter and 120 feet long. The additives of our invention are dispersed in a small amount of oil and then added to the treating mixture containing about 5% pentachlorophenol. This mixture is pumped into the retort until the poles are covered. During the seasoning period, the temperature of the oil treating mixture is increased to and maintained at about 220°F under 24 inches of vacuum for a period of time until the sapwood moisture content of the poles are reduced to approximately 10%; this may take up to about 50 hours. At the conclusion of the seasoning (or drying) cycle, the treating solution is withdrawn from the retort and initial air is introduced to 30 PSI and maintained for one-half hour. Then the same treating mixture is re-introduced with the 30 lbs. pressure retained so that air would not escape from the wood until the retort is completely filled. Additional pressure is applied and the solution forced into the wood to the proper depth at about 190°F. Then the pressure is released and a vacuum applied. This boiling period is called the expansion bath and is maintained for about 2 hours. After the expansion period the treating mixture is pumped from the retort and a final vacuum is applied for one hour.

The poles are then removed from the retort and inspected for surface deposits and color. The treating mixture typically comprises a blend of (I) a blend of (A) about 5% by weight pentachlorophenol and (B) about 95% by weight of a medium aromatic petroleum hydrocarbon oil and (II) about 0.05% by weight based upon the total weight of (A) and (B) of titanium dioxide. This treating mixture also contains about 0.05% by weight based upon the total weight of (A) and (B) of di-tertiary butyl para-cresol and about 0.16% by weight, based upon the total weight of (A) and (B) of bis (2-hydroxyethyl) cocoamine.

This invention will be more readily understood by reference to the accompanying specific examples which are intended as illustrative only rather than as limiting the invention except as defined in the accompanying claims.

Although only a limited number of solvents and co-solvents have been described in the examples in connection with formulation of the treating mixtures embodying the present invention, the latter is not limited to the use of any particular solvent or co-solvent. The present invention broadly provides the means to counteract the sludge-forming and wood-darkening color tendencies inherent in wood-treating formulations.

The practice of our invention is not limited by any particular treating temperature except those temperature ranges outside of practicality.

Four methods were used for the experimental evaluation of the effects of the additives of our invention on wood-treating mixtures and on the treated wood:

A. The 30-day test.
B. The 90-minute test.
C. The experimental retort test.
D. The experimental commercial retort test.

EXAMPLE I

Results using the 30-Day Test procedure are presented in Table I. In the Table, control experiments are compared to the test experiments, the formulation is described, and observations and results are noted. This test evaluates the effectiveness of the additives of our invention as stabilizers for oil-treating mixtures and as to the effect on the condition of the treated wood. A technical description of the 30-Day Test is given below.

A. The 30-Day Test:

The test was conducted by dissolving 7.8 grams of pentachlorophenol in 142.2 grams of the oil to be tested in a 250 ml. Erlenmeyer flask. In addition, various additives were mixed in as needed. The titanium compounds or other metal compounds were dispersed in a small amount of oil prior to mixing with the rest of the treating solution. The mixture was then heated to 300°F for 90 minutes followed by the addition of 7 grams each of Ponderosa pine and Douglas fir sapwood and Western red cedar heartwood chips. In addition, various 4-penny finishing nails and 5 mls. of water were then added. The flask was then stoppered with a cork which has a 6 inch glass tube inserted through it to act as condenser and vent. This was then placed into a 240°F carnuba wax bath to a depth of 1½ inches and the water allowed to flux for 30 days.

Upon completion of the 30 days, the contents of the flask were immediately filtered through a Schleicher and Schuell No. 588, 24 cm. filter paper. The filtered mixture was not only retained for color tests but also to determine the relative amount of tar-like sludge which might precipitate upon cooling. The remaining solids were washed with acetone to determine the amount of insoluble sludge and to observe the condition of the wood.

The color test is performed by placing 4 drops of the filtered solution in a Gardner test tube and then filling to the line with acetone. After shaking, the mixture was tested on the Gardner color scale.

The sludge remaining on the filter paper was graded according to visual examination from extremely light in amount to very heavy in amount. Also, the color of the sludge was noted.

The wood condition was graded according to 1-excellent; 2-good; 3-fair and 4-poor. The wood condition relates to wood color and sludge deposits on the surface of the wood.

The color of the treating mixture was evaluated by placing 20 drops of the filtered solution in a Gardner test tube and then filling to the line with acetone. After shaking, the mixture was tested and graded according to the Gardner scale.

TABLE I

EVALUATION OF ADDITIVES IN WOOD TREATING MIXTURES FOR THE 30-DAY TEST

| Experiment No. | Material[a] | Parts by Wgt. in gms. | Sludge Observation | Color Rating of Treating Mixture | Wood Condition Rating |
|---|---|---|---|---|---|
| A (Control) | PCP<br>Oil A<br>UCON solvent | 7.800<br>139.400<br>2.800 | Medium amount sludge and dark in color. | 11 | 4 |
| B (Test) | PCP<br>Oil A<br>UCON solvent<br>TiO$_2$ | 7.800<br>139.400<br>2.800<br>0.021 | Medium amount sludge and dark brown in color. | 8 | 3–4 |
| C (Test) | PCP<br>Oil A<br>UCON solvent<br>TiO$_2$ | 7.800<br>139.400<br>2.800<br>0.071 | Medium amount of sludge and dark brown in color. | 8–9 | 3–4 |
| D (Test) | PCP<br>Oil A<br>UCON solvent<br>TiO$_2$ | 7.800<br>139.400<br>2.800<br>0.284 | Medium amount of sludge and light tan in color. | 6 | 2–3 |
| E (Test) | PCP<br>Oil A<br>UCON solvent<br>TiO$_2$ | 7.800<br>139.400<br>2.800<br>50.000 | No sludge | 2 | 1 |
| F (Test) | PCP<br>Oil A<br>UCON solvent<br>TiO$_2$ | 7.800<br>139.400<br>2.800<br>150.000 | No sludge. | 3 | 1 |
| A (Control) | PCP<br>Oil A | 7.800<br>142.200 | Medium amount of sludge and dark in color. Medium amount tar formation. | 9 | 4 |

TABLE I—Continued

EVALUATION OF ADDITIVES IN WOOD TREATING MIXTURES FOR THE 30-DAY TEST

| Experiment No. | Formulation of Treating Mixture | | Test Results | | |
|---|---|---|---|---|---|
| | Material[a] | Parts by Wgt. in gms. | Sludge Observation | Color Rating of Treating Mixture | Wood Condition Rating |
| 2 B (Test) | PCP<br>Oil A<br>DTBC<br>TiO$_2$ | 7.800<br>142.200<br>0.150<br>0.070 | Light amount sludge and grey in color. No tar formation. | 5 | 2 |
| A (Control) | PCP<br>Oil A<br>Base A | 7.800<br>114.000<br>28.000 | Medium amount sludge and dark colored. | 11 | 3 |
| 3 B (Test) | PCP<br>Oil A<br>Base A<br>TiO$_2$<br>DTBC | 7.800<br>114.200<br>28.000<br>0.070<br>0.150 | Extremely light amount of sludge and light in color. | 8 | 1-2 |
| A (Control) | PCP<br>Oil B<br>Amine A | 7.800<br>142.200<br>0.100 | Medium light sludge and dark in color. | 14-15 | 3-4 |
| 4 B (Test) | PCP<br>Oil B<br>Amine A<br>TiO$_2$ | 7.800<br>142.200<br>0.100<br>0.070 | Light amount of sludge and dark grey in color. | 11 | 2-3 |
| A (Control) | PCP<br>Oil A<br>UCON solvent | 7.800<br>139.400<br>2.800 | Medium amount of sludge and dark in color. | 11 | 4 |
| B (Test) | PCP<br>Oil A<br>UCON solvent<br>TiO$_2$<br>DTBC | 7.800<br>139.400<br>2.800<br>.021<br>0.050 | Medium amount of sludge and very dark. | 8-9 | 3 |
| 5 C (Test) | PCP<br>Oil A<br>UCON solvent<br>TiO$_2$<br>DTBC | 7.800<br>139.400<br>2.800<br>0.284<br>0.050 | Medium amount of sludge and tan-grey in color. | 6 | 2 |
| D (Test) | PCP<br>Oil A<br>UCON solvent<br>TiO$_2$<br>DTBC | 7.800<br>139.400<br>2.800<br>0.071<br>10.000 | Extremely light amount of sludge and light grey in color. | 10-11 | 2-3 |

[a]Definition of materials: PCP = pentachlorophenol; DTBC = di-tertiary-butyl para-cresol; TiO$_2$ = titanium dioxide; amine A = bis(2-hydroxyethyl)cocoamine; UCON solvent = a co-solvent supplied by Union Carbide Co.; Oil A = PS 200, low aromatic oil supplied by Time Oil Co.; Oil B = Husky oil, medium aromatic oil supplied by Husky Oil Co.; Oil C = Shell No. 2 diesel oil, supplied by Shell Oil Co.; Base A = aromatic oil supplied by Standard Oil of California.

EXAMPLE II

Results using the 90-Minute Test procedure are presented in Table II. In the Table, control experiments are compared to test experiments, the formulations are described, and observations are made regarding sludge formation and color of the treating mixture. This test evaluates the effectiveness of the additives of our invention as stabilizers for oil-treating mixtures. Wood treating is not involved here. A technical description of the 90-Minute Test is given below.

B. The 90-Minute Oil Test:

The basic oil solution for each test was made up by dissolving 10 grams of pentachlorophenol in 90 grams of oil contained in a 125 ml. Erlenmeyer flask. Additives were mixed in as desired. The titanium dioxide or other metal compounds was first dispersed in a small amount of oil prior to mixing with the rest of the treating mixture.

The control and test samples were placed in an oven at 300°F for 90 minutes and then removed and cooled.

The cooled mixture was filtered through a No. 40 Whatman filter paper.

Evaluation of the effect on the oils was performed in the following way. The sludge remaining on the filter paper was graded as to amount according to visual examination; that is, as light, medium, heavy and as variations of these. Also, the color of the sludge was noted.

TABLE II

EVALUATION OF ADDITIVES IN WOOD TREATING MIXTURES BY THE 90-MINUTE TEST

| Experiment No. | Formulation of Treating Mixture | | Test Results | |
|---|---|---|---|---|
| | Material[a] | Parts by Wgt. in gms. | Sludge Observation | Color Rating of Treating Mixture |
| A (Control) | PCP<br>Oil D | 10.000<br>90.000 | Heavy amount of sludge and black in color. | 7-8 |
| B (Test) | PCP<br>Oil D<br>TiO$_2$ | 10.000<br>90.000<br>0.071 | Heavy amount of sludge and grey in color. | 6-7 |

TABLE II—Continued

EVALUATION OF ADDITIVES IN WOOD TREATING MIXTURES BY THE 90-MINUTE TEST

| Experiment No. | | Formulation of Treating Mixture | | Test Results | |
|---|---|---|---|---|---|
| | Material[a] | Parts by Wgt. in gms. | | Sludge Observation | Color Rating of Treating Mixture |
| 1 | | | | | |
| C (Test) | PCP | 10.000 | | Very light amount of sludge and grey in color. | 7 |
| | Oil D | 90.000 | | | |
| | Amine A | 0.030 | | | |
| | TiO$_2$ | 0.071 | | | |
| D (Test) | PCP | 10.000 | | Very light amount sludge and light grey in color. | 6–7 |
| | Oil D | 90.000 | | | |
| | Amine A | 0.030 | | | |
| | DTBC | 0.150 | | | |
| | TiO$_2$ | 0.071 | | | |
| A (Control) | PCP | 10.000 | | Very light amount of sludge and black in color. | 12–13 |
| | Oil B | 90.000 | | | |
| | Amine A | 0.030 | | | |
| 2 | | | | | |
| B (Test) | PCP | 10.000 | | No sludge | 12 |
| | Oil B | 90.000 | | | |
| | Titanium metal | 0.100 | | | |
| | Amine A | 0.020 | | | |
| A (Control) | PCP | 10.000 | | Heavy amount of sludge and dark colored. | 14 |
| | Oil B | 90.000 | | | |
| B (Test) | PCP | 10.000 | | No sludge. | 13–14 |
| | Oil B | 90.000 | | | |
| | TiO | 0.060 | | | |
| 3 | | | | | |
| C (Test) | PCP | 10.000 | | Medium amount sludge and grey in color. | 14 |
| | Oil B | 90.000 | | | |
| | Titanium silicate | 0.060 | | | |
| D (Test) | PCP | 10.000 | | Medium amount sludge and grey in color. | 13–14 |
| | Oil B | 90.000 | | | |
| | Titanium diboride | 0.060 | | | |
| A (Control) | PCP | 10.000 | | Heavy amount sludge and dark in color. | 6 |
| | Oil D | 90.000 | | | |
| 4 | | | | | |
| B (Test) | PCP | 10.000 | | Medium amount sludge and light grey in color. | 4 |
| | Oil D | 90.000 | | | |
| | TiO$_2$ | 0.071 | | | |
| | Tertiary-butyl hydroquinone | 0.05 | | | |
| 4 | | | | | |
| C (Test) | PCP | 10.000 | | Extremely light amount sludge and light grey in color. | 5 |
| | Oil D | 90.000 | | | |
| | TiO$_2$ | 0.071 | | | |
| | Ethoduomeen T-13 | 0.030 | | | |
| A (Control)[b] Run at 122°F | PCP | 10.000 | | Light-medium amount of sludge and black in color. | 6–7 |
| | Oil B | 90.000 | | | |
| 5 | | | | | |
| B (Test) Run at 122°F | PCP | 10.000 | | Light-medium amount of sludge and grey-green in color. | 6 |
| | Oil B | 90.000 | | | |
| | TiO$_2$ | 0.071 | | | |
| A (Control) Run at 212°F | PCP | 10.000 | | Medium amount of sludge and black in color. | 9–10 |
| | Oil B | 90.000 | | | |
| 6 | | | | | |
| B (Test) Run at 212°F | PCP | 10.000 | | Medium amount of sludge and grey-green in color. | 8 |
| | Oil B | 90.000 | | | |
| | TiO$_2$ | 0.071 | | | |
| A (Control) Run at 356°F | PCP | 10.000 | | Medium-heavy amount of sludge and black in color. | 11–12 |
| | Oil B | 90.000 | | | |
| 7 | | | | | |
| B (Test) Run at 356°F | PCP | 10.000 | | Very light amount of sludge and light grey in color. | 12 |
| | Oil B | 90.000 | | | |
| | TiO$_2$ | 0.071 | | | |
| | Ethoduomeen T-13 | 0.030 | | | |
| A (Control) | PCP | 10.000 | | Medium-heavy amount of sludge and black in color. | 11–12 |
| | Oil B | 90.000 | | | |

TABLE II—Continued

EVALUATION OF ADDITIVES IN WOOD TREATING MIXTURES BY THE 90-MINUTE TEST

| Experiment No. | Formulation of Treating Mixture | | Test Results | |
|---|---|---|---|---|
| | Material[a] | Parts by Wgt. in gms. | Sludge Observation | Color Rating of Treating Mixture |
| 8 B (Test) | PCP<br>Oil B<br>PbO | 10.000<br>90.000<br>0.070 | Light amount of sludge and buff colored. | 12 |
| C (Test) | PCP<br>Oil B<br>$SnO_2$ | 10.000<br>90.000<br>0.070 | Medium heavy sludge and dark grey in color. | 11–12 |
| D (Test) | PCP<br>Oil B<br>$Ag_2O$ | 10.000<br>90.000<br>0.070 | Medium-heavy amount of sludge and grey-brown in color. | 11–12 |
| E (Test) | PCP<br>Oil B<br>$SiO_2$ | 10.000<br>90.000<br>0.100 | Medium amount of sludge and dark in color. | 10–11 |
| 8 F (Test) | PCP<br>Oil B<br>$Cr_2O_3$ | 10.000<br>90.000<br>0.070 | Medium heavy amount of sludge and green in color. | 11–12 |
| G (Test) | PCP<br>Oil B<br>$Co_2O_3$ | 10.000<br>90.000 | Medium-heavy amount of sludge and black in color. | 11 |
| H (Test) | PCP<br>Oil B<br>$WO_3$ | 10.000<br>90.000<br>0.070 | Medium-heavy amount of sludge and dark grey in color. | 11–12 |
| I (Test) | PCP<br>Oil B<br>$Fe_2O_3$ | 10.000<br>90.000<br>0.070 | Medium heavy amount of sludge and red-brown in color. | 11–12 |

[a]Definition of materials: PCP = pentachlorophenol; Oil B = medium aromatic petroleum oil supplied by Huskey Oil Co.; Oil D = Certrex 50C, medium aromatic petroleum oil supplied by Mobile Oil Co.; Amine A = bis(2-hydroxyethyl) cocoamine; $TiO_2$ = titanium dioxide; DTBC = di-tertiary-butyl para-cresol; TiO = titanium mono-oxide; ethoduomeen T-13 = a surfactant (polyethoxylated diamine) supplied by Armour Industrial Chemical Co.; PbO = lead oxide; $SnO_2$ = stannic oxide; $Ag_2O$ = silver oxide; $SiO_2$ = silicon dioxide; $Cr_2O_3$ = chromic oxide; $Co_2O_3$ = cobaltic oxide; $WO_3$ = tungsten trioxide; $Fe_2O_3$ = iron oxide.

[b]Tests 5, 6 and 7 were run at different temperatures than normally run in the 90-Minute Test to demonstrate usefulness of the invention over a range of temperatures.

EXAMPLE III

Results using the Pilot Retort Test procedure are presented in Table III. This test evaluates the effectiveness of the additives of our invention as stabilizers for oil treating mixtures and as to their effect on the condition of treated wood. The retort and accessories is actually a wood-treating pilot plant. In the table, a control experiment is used to compare against the test experiments, the formulation is described, and observations made in regard to the treated poles. A technical description of the Pilot Retort Test procedure is given below.

C. Experimental Retort Test:

The standard American Wood Preservers' Association treating procedures (AWPA standard C-4) were used. Wooden posts ranging from dry to green, approximately 6 inches in diameter and 6 feet 6 inches long, were placed in a retort. The metal compounds (with or without co-additives) were dispersed in a small amount of oil and then added to the treating mixture containing 5% pentachlorophenol. This mixture was pumped into the retort until the posts were completely covered. During the seasoning period, the temperature of the oil treating mixture was increased to and maintained at 220°F. under a 26 inch vacuum for a period of time until the sapwood moisture content of the posts were reduced to approximately 10%; this took up to 36 hours. At the conclusion of the seasoning (or drying) cycle, the treating solution was withdrawn from the retort and initial air was introduced to 30 No. P.S.I. and maintained for one-half hour. Then the same treating mixture was re-introduced with the 30 No. pressure retained so that the air would not escape from the wood. Next the retort was completely filled with treating mixture and additional pressure was applied and the solution forced into the wood to the proper depth at 190°F. When the proper amount of treating mixture had been forced into the wood (min. 100% of the sapwood penetrated), the pressure was released and a vacuum applied. This boiling period is called the expansion bath and it was maintained for 2 hours. After the expansion period the treating mixture was pumped from the retort after which a ½ hour final vacuum was applied. The posts were then removed from the retort and inspected for surface deposits and color as well as checking, etc. Comparisons were then made between the controls and test pieces. When control runs were made, no additives were introduced into the treating mixture.

TABLE III

EVALUATION OF ADDITIVES IN WOOD TREATING MIXTURES FOR THE PILOT RETORT TESTS

| Experiment No. | Formulation of Treating Mixture | | Test Results |
|---|---|---|---|
| | Material[a] | Parts by Wgt. in lbs. | Observation of Poles |
| A (Control) | PCP<br>UCON solvent<br>Oil A | 19.200<br>7.000<br>354.000 | Medium amount of sludge and dark colored. Post surface dark on 1 side and medium dark on the other side. |

TABLE III —Continued

EVALUATION OF ADDITIVES IN WOOD TREATING MIXTURES FOR THE PILOT RETORT TESTS

| Experiment No. | | Formulation of Treating Mixture | | Test Results |
|---|---|---|---|---|
| | | Material[a] | Parts by Wgt. in lbs. | Observation of Poles |
| 1 | B (Test) | PCP<br>UCON solvent<br>Oil A<br>TiO₂ | 19.200<br>7.000<br>354.000<br>0.360 | Light amount of sludge and medium grey in color.<br>Wood posts have light grey color. |
| | C (Test) | PCP<br>UCON solvent<br>Oil A<br>DTBC<br>TiO₂ | 19.200<br>7.000<br>354.000<br>0.310<br>0.140 | No sludge was formed. Wood posts have light amber color. |
| | D (Test) | PCP<br>UCON solvent<br>Oil A<br>Amine A<br>TiO₂ | 19.200<br>7.000<br>354.000<br>0.070<br>0.220 | No sludge. Wood surface color very light. |
| 2 | A (Control) | PCP<br>Oil B | 19.200<br>361.000 | Some sludge and dark in color. Post surfaces dark in color. |
| | B (Test) | PCP<br>Oil B<br>DTBC<br>TiO₂<br>Amine A | 19.200<br>361.000<br>0.190<br>0.170<br>0.070 | No sludge was formed. Post surfaces light beige in color. |
| | C (Test) | PCP<br>Used Oil B<br>DTBC<br>TiO₂<br>Amine A | 19.200<br>361.000<br>0.190<br>0.170<br>0.070 | No sludge was formed. Post surfaces light grey in color. |
| 3 | A (Control) | PCP<br>Oil D | 19.200<br>361.000 | Medium heavy sludge and dark in color. Post surfaces dark in color. |
| | B (Test) | PCP<br>Oil D<br>DTBC<br>TiO₂<br>Amine A | 19.200<br>361.000<br>0.190<br>0.170<br>0.070 | No sludge. Post surfaces light tan in color. |
| 4 | A (Control) | PCP<br>Oil E | 19.200<br>361.000 | Light sludge and dark in color. Post surfaces dark brown in color. |
| | B (Test) | PCP<br>Oil E<br>DTBC<br>TiO₂<br>Amine A | 19.200<br>361.000<br>0.190<br>0.170<br>0.070 | No sludge. Post surfaces light beige in color. |

[a]Definition of material: PCP = pentachlorophenol; DTBC = di-tertiary-butyl para-cresol; TiO₂ = titanium dioxide; Amine A = bis(2-hydroxyethyl) cocoamine; Oil A = PS 200, low aromatic oil supplied by Time Oil Co.; Oil B = Husky Oil, medium aromatic oil supplied by Husky Oil Co.; Oil D = Certrex 50C, medium aromatic oil supplied by Mobile Oil Co.; Oil E = Shell Chemical Co. TP No. 1, medium aromatic oil supplied by Shell Chemical Co.

EXAMPLE IV

Results using an Experimental Commercial Treating Plant method are presented in Table IV in which a control experiment is used to compare against the test experiments, the formulation is described and observations made in regard to the treated poles.

This test evaluates the effectiveness of the additives of our invention as stabilizers for oil treating mixtures and as to their effect on the condition of the treated wood on a large scale. A technical description of this procedure is given below.

D. Experimental Commercial Retort Test:

The American Wood Preservers' Association procedures were used. Wooden poles ranging from dry to green in various sizes ranging from 6 inches in diameter and 12 feet in length to 20 inches in diameter and 100 feet in length were placed in a retort 7 feet in diameter and 120 feet long. The additives of our invention were dispersed in a small amount of oil and then added to the treating mixture containing 5% pentachlorophenol. This mixture was pumped into the retort until the poles were covered. During this seasoning period, the temperature of the oil treating mixture was increased to and maintained at 220°F under 24 inches of vacuum for a period of time until the sapwood moisture content of the poles were reduced to approximately 10%; this took up to 50 hours. At the conclusion of the seasoning (or drying) cycle, the treating solution was withdrawn from the retort and initial air was introduced to 30 PSI and maintained for one-half hour. Then the same treating mixture was reintroduced with the 30 lbs. pressure retained so that air would not escape from the wood until the retort was completely filled. Additional pressure was applied and the solution forced into the wood to the proper depth at 190°F. Then the pressure was released and a vacuum applied. This boiling period is called the expansion bath and was maintained for two hours. After the expansion period the treating mixture was pumped from the retort and final vacuum applied for one hour.

The poles were then removed from the retort and inspected for surface deposits and color as well as checking, etc. Comparisons were made between the controls and test pieces. When control runs were made, no additives were introduced into the treating mixture.

TABLE IV

EVALUATION OF ADDITIVES IN WOOD TREATING MIXTURES FOR THE EXPERIMENTAL COMMERCIAL RETORT TESTS

| Experiment No. | | Formulation of Treating Mixture | | Test Results |
|---|---|---|---|---|
| | | Material[a] | Parts by Wgt. in lbs. | Observation of Treated Poles |
| 1 | A (Control) | PCP<br>Oil D | 9,360<br>170,640 | Medium-heavy amount of sludge and black in color. Pole surface dark. |
| | B (Test) | PCP<br>Oil D<br>DTBC<br>Amine A<br>$TiO_2$ | 9,360<br>170,640<br>93<br>30<br>90 | No sludge observed. Pole surface light amber. |
| 2 | A (Control) | PCP<br>Oil A<br>UCON solvent | 9,360<br>167,280<br>3,360 | Medium amount of sludge and black in color. Pole surface dark. |
| | B (Test) | PCP<br>Oil A<br>UCON solvent<br>DTBC<br>Amine A<br>$TiO_2$ | 9,360<br>167,280<br>3,360<br>93<br>30<br>90 | No sludge observed. Pole surface beige color. |

[a]Definition of material: PCP = pentachlorophenol; DTBC = di-tertiary butyl para-cresol; $TiO_2$ = titanium dioxide; amine A = bis(2-hydroxyethyl)cocoamine; Oil A = PS 200, low aromatic oil supplied by Time Oil Co.; Oil D = Certrex 50C, medium aromatic oil supplied by Mobile Oil Co.; UCON solvent = a co-solvent supplied by Union Carbide Co.

What is claimed is:

1. The wood preservative composition useful in pressure vacuum techniques for treating heavy timbers consisting essentially of a blend of (I) a blend of (A) from about 1% to about 50% by weight of pentachlorophenol and (B) from about 99% to 50% by weight of a petroleum hydrocarbon oil and (II) from about 0.005% to about 100% by weight, based upon the total weight of (A) and (B), of a member of a group consisting of the metals titanium, lead, tungsten, iron, chromium, tin, silver and cobalt and the oxides thereof added to prevent accumulation of sludge.

2. The wood preservative as defined in claim 1 wherein (II) is at least one metal selected from a group consisting of titanium, lead tungsten, iron, chromium, tin, silver and cobalt.

3. The wood preservative compound as set forth in claim 1 wherein (II) is at least one member of the group consisting of titanium oxide, lead oxide, tungsten oxide, iron oxide, chromium oxide, tin oxide, silver oxide and cobalt oxide.

* * * * *